US007711935B2

(12) United States Patent
Singh et al.

(10) Patent No.: US 7,711,935 B2
(45) Date of Patent: May 4, 2010

(54) UNIVERSAL BRANCH IDENTIFIER FOR INVALIDATION OF SPECULATIVE INSTRUCTIONS

(75) Inventors: Gaurav Singh, Los Altos, CA (US); Srivatsan Srinivasan, San Jose, CA (US); Ricardo Ramirez, Sunnyvale, CA (US); Wei-Hsiang Chen, Sunnyvale, CA (US); Hai Ngoc Nguyen, Redwood City, CA (US)

(73) Assignee: Netlogic Microsystems, Inc., Mountain View, CA (US)

( * ) Notice: Subject to any disclaimer, the term of this patent is extended or adjusted under 35 U.S.C. 154(b) by 356 days.

(21) Appl. No.: 11/799,293

(22) Filed: Apr. 30, 2007

(65) Prior Publication Data

US 2008/0270774 A1 Oct. 30, 2008

(51) Int. Cl.
*G06F 9/32* (2006.01)
(52) U.S. Cl. ...................................... 712/239
(58) Field of Classification Search ........................ None
See application file for complete search history.

(56) References Cited

U.S. PATENT DOCUMENTS

| | | | | |
|---|---|---|---|---|
| 5,809,566 A * | 9/1998 | Charney et al. | ............. | 711/213 |
| 6,425,076 B1 * | 7/2002 | Killian | ........................ | 712/239 |
| 6,477,640 B1 * | 11/2002 | Rupley et al. | ................ | 712/238 |
| 6,581,138 B2 * | 6/2003 | Gelman | ....................... | 711/125 |
| 7,082,520 B2 | 7/2006 | Bonanno et al. | ............. | 712/236 |
| 2003/0033505 A1 | 2/2003 | Joshi et al. | ................... | 712/215 |
| 2006/0149933 A1 | 7/2006 | Eickemeyer et al. | ......... | 712/219 |
| 2007/0005938 A1 | 1/2007 | Grandou et al. | ............. | 712/207 |
| 2007/0016760 A1 | 1/2007 | Kuo | ............................ | 712/239 |

OTHER PUBLICATIONS

International Search Report and Written Opinion from PCT Application No. PCT/US08/05509 mailed on Sep. 11, 2008.

* cited by examiner

*Primary Examiner*—Eric Coleman
(74) *Attorney, Agent, or Firm*—Vista IP Law Group LLP

(57) ABSTRACT

A system for speculative branch predictions. An embodiment of the system includes branch prediction logic, fetch logic, and branch identification logic. The branch prediction logic is configured to predict a branch path for a branch in an instruction stream. The fetch logic is coupled to the branch prediction logic. The fetch logic is configured to speculatively fetch an instruction corresponding to the predicted branch path. The branch identification logic is coupled to the branch prediction logic and the fetch logic. The branch identification logic is configured to mark the speculatively fetched instruction with a branch identifier using a universal branch identification format. The universal branch identification format includes a bit value at a bit position corresponding to the predicted branch path.

33 Claims, 6 Drawing Sheets

| | | |
|---|---|---|
| | $I_0$ | 000 |
| | $I_1$ | 000 |
| | $BR_0$ | 000 |
| | $I_2$ | 001 |
| | $I_3$ | 001 |
| | $BR_1$ | 001 |
| | $I_4$ | 01<u>1</u> |
| | $I_5$ | 01<u>1</u> |
| | $BR_2$ | 01<u>1</u> |
| | $I_6$ | 1<u>11</u> |
| | $I_7$ | 1<u>11</u> |

UNIVERSAL BRANCH IDENTIFIER FOR INVALIDATION OF SPECULATIVE INSTRUCTIONS

BACKGROUND

Many processors use some type of branch prediction to anticipate which instructions will be needed in a given instruction stream. Branch predictions are used to potentially increase the performance of the processor by speculatively fetching instructions that correspond to a predicted branch path. There are many conventional methods of predicting branch paths, speculatively fetching instructions, and resolving whether the predicted branch path is actually used or whether the predicted branch path is a misprediction.

If instructions for a predicted branch path are speculatively fetched, and the predicted branch path later turns out to be a mispredicted branch path, then there should be some way to invalidate the speculatively fetched instructions so that the pipeline resources can be allocated to other instructions. Although some conventional speculative instruction technologies use invalidation methods, these conventional invalidation methods are complex and difficult to implement or do not allow instant (atomic) invalidation of all mis-speculated instructions.

SUMMARY

Embodiments of a system are described. In one embodiment, the system is a system for speculative branch predictions. An embodiment of the system includes branch prediction logic, fetch logic, and branch identification logic. The branch prediction logic is configured to predict a branch path for a branch in an instruction stream. The fetch logic is coupled to the branch prediction logic. The fetch logic is configured to speculatively fetch an instruction corresponding to the predicted branch path. The branch identification logic is coupled to the branch prediction logic and the fetch logic. The branch identification logic is configured to mark the speculatively fetched instruction with a branch identifier using a universal branch identification format. The universal branch identification format includes a bit value at a bit position corresponding to the predicted branch path. Other embodiments of the system are also described.

Embodiments of a method are also described. In one embodiment, the method is a method for speculative branch predictions. An embodiment of the method includes predicting a branch path for a branch in an instruction stream, fetching an instruction corresponding to the predicted branch path, and marking the speculatively fetched instruction with a branch identifier using a universal branch identification format. The universal branch identification format includes a bit value at a bit position corresponding to the predicted branch path. Other embodiments of the method are also described.

Embodiments of a computer readable storage medium are also described. In one embodiment, the computer readable storage medium embodies a program of machine-readable instructions, executable by a digital processor, to perform operations to facilitate speculative instruction invalidation. The operations include an operation to fetch an instruction corresponding to a predicted branch path in an instruction stream. The operations also include an operation to mark the speculatively fetched instruction with a branch identifier using a universal branch identification format. The universal branch identification format includes a bit value at a bit position corresponding to the predicted branch path. The operations also include an operation to invalidate the speculatively fetched instruction in response to an invalidation command. The invalidation command includes the bit value at the bit position corresponding to the predicted branch path. Other embodiments of the computer readable storage medium are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
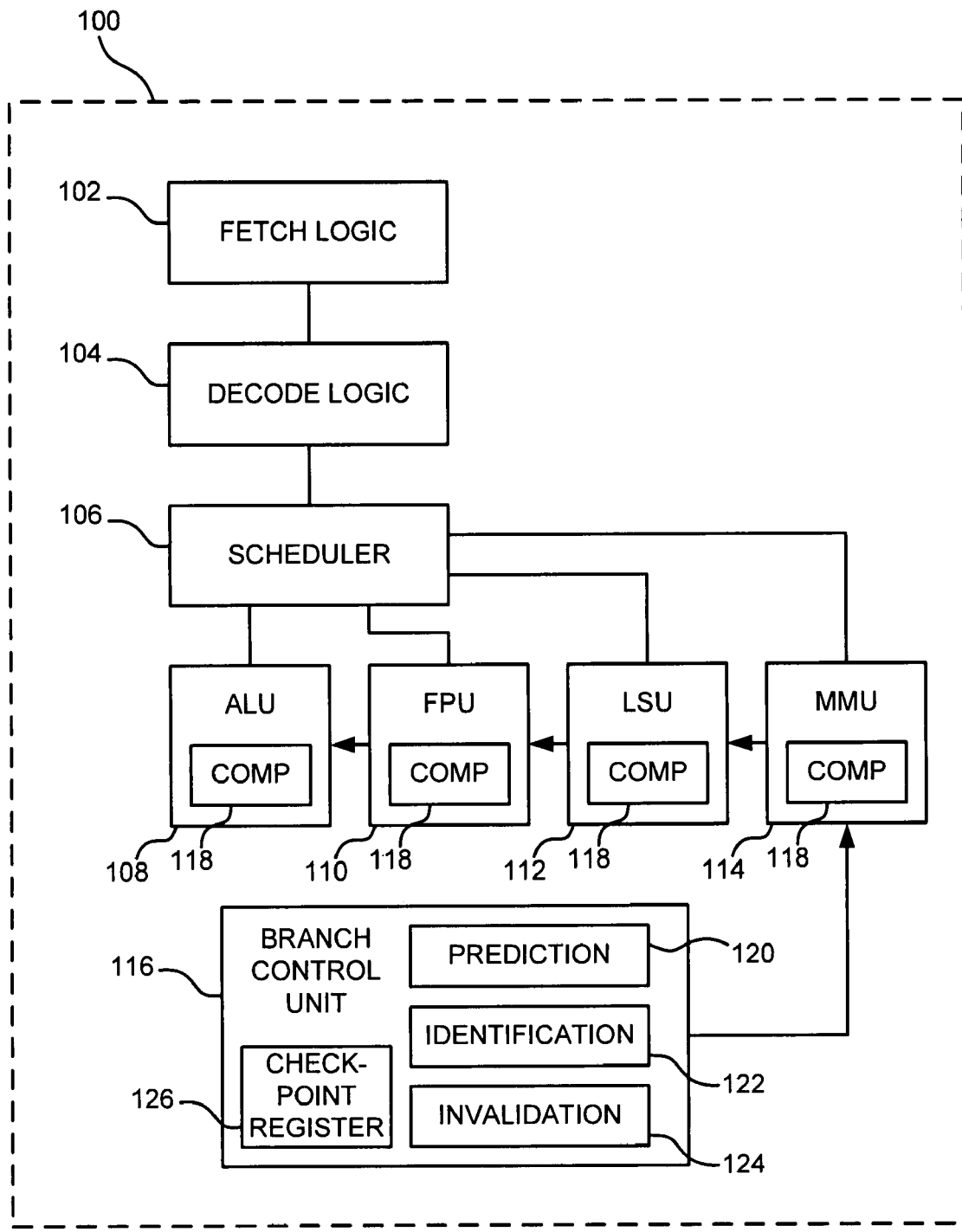
FIG. 1 depicts a schematic block diagram of one embodiment of a processor.

FIG. 1 depicts a schematic block diagram of one embodiment of a processor 100. In one embodiment, the processor 100 implements a reduced instruction set computer (RISC) design. Additionally, the processor 100 may implement a design based on the MIPS instruction set architecture (ISA). However, alternative embodiments may implement other instruction set architectures. Moreover, other embodiments of the processor 100 may include fewer or more components than are shown in FIG. 1.

The illustrated processor 100 includes fetch logic 102, decode logic 104, and a scheduler 106. In general, the fetch logic 102 fetches instructions from a cache (not shown) at a specified address. Once an instruction is fetched at the specified address, the decode logic 104 manages the registers associated with the fetched instruction. The scheduler 106 then schedules each instruction for dispatch to an appropriate execution unit.

The illustrated processor 100 includes four execution units, including an arithmetic logic unit (ALU) 108, a floating point unit (FPU) 110, a load/store unit (LSU) 112, and a memory management unit (MMU) 114. Each of these execution units is coupled to the scheduler 106, which schedules instructions for execution by one of the execution units. Once an instruction is scheduled for execution, the instruction may be sent to the corresponding execution unit where it is stored in an instruction queue, or buffer.

A branch control unit 116 is also coupled to one or more of the execution units. In one embodiment, the branch control unit 116 manages speculatively fetched instructions related to predicted branch paths. In other words, the branch control unit 116 may control at least some of the operations of the execution units by flushing in-flight instructions.

In one embodiment, the branch control unit 116 includes various components such as branch prediction logic 120, instruction identification logic 122, and instruction invalidation logic 124. The branch control unit 116 also includes a branch checkpoint register 126. Other embodiments of the branch control unit 116 may include fewer or more logic components, as well as other components. For example, the branch control unit 116 may include a memory device (not shown). The branch checkpoint register 126 may be stored in the memory device of the branch control unit 116. Alternatively, the branch control unit 116 may be coupled to a local memory device such as the cache. Additionally, the branch control unit 116 may be directly or indirectly coupled to one or more of the fetch logic 102, the decode logic 104, and the scheduler 106.

Figure 2:
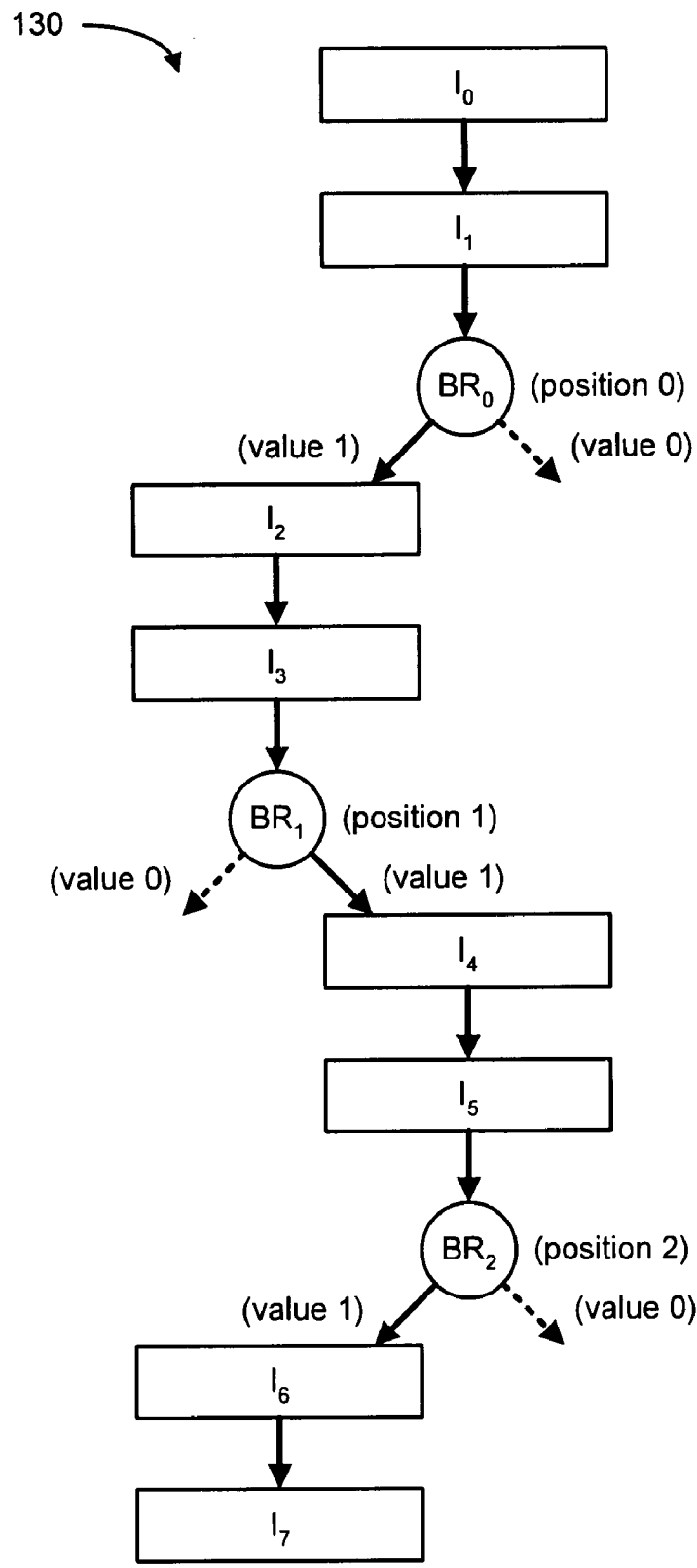
FIG. 2 depicts a schematic diagram of one embodiment of an instruction stream with multiple branches and predicted branch paths.

In one embodiment, the branch prediction logic 120 is configured to predict a branch path for a branch in an instruction stream. One example of predicted branches in an instruction stream is shown in FIG. 2 and described in more detail below. Depending on the implementation of the branch prediction logic 120, the branch prediction logic 120 may implement one or more types of branch prediction. For example, the branch prediction logic 120 may implement static branch prediction, bimodal branch prediction, or another type of branch prediction. Once a branch path is predicted, the fetch logic 102 is configured to speculatively fetch an instruction corresponding to the predicted branch path.

In one embodiment, the instruction identification logic 122 is configured to mark the speculatively fetched instruction with a branch identifier using a universal branch identification format. The universal branch identification format includes a bit value at a bit position corresponding to the predicted branch path. In particular, the universal branch identification format assigns one bit position to each branch, and further assigns a bit value to each predicted branch path. For example, the bit value for a predicted branch path may be a logical high signal (e.g., a logical "1") or a logical low signal (e.g., a logical "0").

Other embodiments may be implemented in a multi-threaded system, in which multiple threads are fetched and/or executed in the pipeline of the processor 100 at the same time. In a multi-threaded system, the universal branch identification format also includes a thread identifier. In this way, a branch misprediction of one thread results in the invalidation of the instructions belonging to that thread, but not to other threads. The invalidation format is extended to include a thread ID in addition to the bit vector (i.e., the position and value). The comparators in the various execution units compare the thread identifiers to thread identifiers of an invalidation command. This facilitates limiting invalidation commands to particular threads, if necessary. In some embodiments, the bit vector is used without any change for the multi-threading environment. In another embodiment, the bit vector is partitioned into groups, each group corresponding to a particular thread. In this embodiment, the invalidation command does not need to be extended to include the thread ID. Additional details of an embodiment of the universal branch identification format are provided below with respect to the description of FIG. 3.

In one embodiment, the instruction invalidation logic 124 is configured to invalidate a speculatively fetched instruction in response to an invalidation command. The invalidation command may be generated, for example, in response to an occurrence of a mispredicted branch. Alternatively, the invalidation command may be generated in response to an occurrence of an exception or another type of event. If an instruction encounters an exception, the branch control unit 116 may wait for all previous instructions to complete and then issue a flush for the corresponding branch path. In this way, instructions before the exception are not necessarily flushed.

In one embodiment, the invalidation command includes a bit value at a bit position corresponding to a predicted branch path. Although the format and implementation of the invalidation command are described in more detail below, it should be noted that each of the execution units (i.e., the ALU 108, the FPU 110, the LSU 112, and the MMU 114) includes a comparator 118 to compare the invalidation command to the branch identifiers associated with each of the in-flight instructions in the corresponding instruction queues. In this way, the comparators 118 determine whether to invalidate any of the in-flight instructions, depending on whether the invalidation command matches any of the branch identifiers.

In one embodiment, the branch checkpoint register 126 is used to checkpoint the state of the processor 100 before a branch instruction. Although the branch checkpoint register 126 may be implemented in various configurations, some embodiments use the positions of the branches within the entries of the branch checkpoint register 126 as the position in the branch identifier. In this way, the allocation of a position for each branch is simple and does not necessitate additional logic.

FIG. 2 depicts a schematic diagram of one embodiment of an instruction stream 130 with multiple branches and predicted branch paths. Each non-branch instruction is designated as $I_i$, with eight non-branch instructions $I_0$ through $I_7$ shown in the instruction stream 130. Each branch is designated as $BR_i$, with three branches $BR_0$ through $BR_2$ shown in the instruction-stream 130. Each predicted branch path is designated with a solid arrow, while the branch paths not predicted are designated with dashed arrows.

In order to identify the various instructions of the instruction stream 130, the universal branch identification format may be used. In one embodiment, the universal branch identification format includes a bit position associated with each branch, and a bit value associated with each predicted branch path of the corresponding branch. In this way, each instruction in a predicted branch path can be assigned a branch identifier with the corresponding bit value at the corresponding bit position. For example, the instructions $I_2$ and $I_3$ in the predicted branch path from branch $BR_0$ may have associated branch identifiers with a bit value of "1" at the bit position "0." In a similar manner, the instructions $I_4$ and $I_5$ in the predicted branch path from branch $BR_1$ may have associated branch identifiers with a bit value of "1" at the bit position "1." Furthermore, the instructions $I_6$ and $I_7$ in the predicted branch path from branch $BR_2$ may have associated branch identifiers with a bit value of "1" at the bit position "2."

Figures 3, 4:
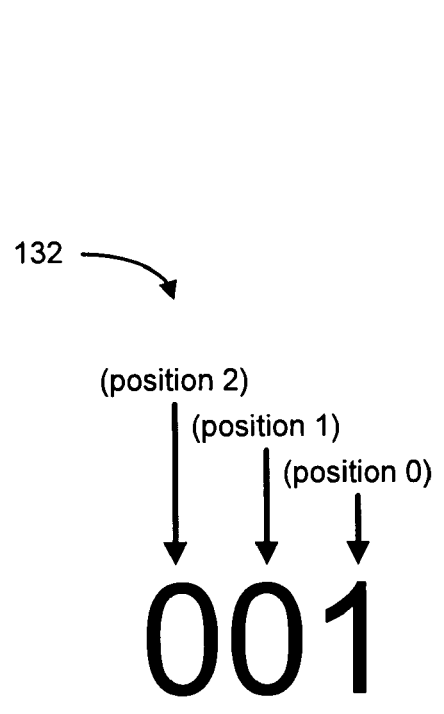
FIG. 3 depicts a schematic diagram of one embodiment of a universal branch identification format to identify a plurality of speculatively fetched instructions corresponding to different predicted branch paths.
FIG. 4 depicts a schematic diagram of one embodiment of an instruction identification table to identify a plurality of speculatively fetched instructions.

FIG. 3 depicts a schematic diagram of one embodiment of a universal branch identification format 132 to identify a plurality of speculatively fetched instructions corresponding to different predicted branch paths. The illustrated universal branch identification format 132 includes three bit positions designated as position "0," position "1," and position "2." These bit positions correspond to specific branches in the instruction stream 130. In particular, bit position "0" corresponds to branch $BR_0$, bit position "1" corresponds to branch $BR_1$, and bit position "2" corresponds to branch $BR_2$ of the instruction stream 130 shown in FIG. 2.

As an example, the bit value at the bit position "0" is a logical "1" to indicate that the corresponding speculative instruction is associated with the predicted branch path of branch $BR_0$. In contrast, the bit values at the bit positions "1" and "2" are logical "0" to indicate that the corresponding speculative instruction is not associated with the predicted branch paths of branches $BR_1$ and $BR_2$.

In this manner, the universal branch identification format 132 can be used for all of the instructions in the instruction stream 130 by simply changing the bit values at the corresponding bit positions. Where each bit position is used for at least one branch in the instruction stream 130, the universal branch identification format can identify at least n and up to 2n different predicted branch paths by using n bits. In particular, the universal branch prediction format can identify n unresolved branch paths using n bits by using each bit position for a single branch.

In some embodiments, the universal branch prediction format can identify 2n predicted branch paths using each bit position for two branches in the instruction stream 130. In order to use each bit position for two branches, the different branches assigned to the same bit position may be identified using different bit values. For example, a first predicted branch path for a branch assigned to bit position "0" may be indicated by a logical "1," while a second predicted branch path for a second branch assigned to the same bit position may be indicated by a logical "0." In this manner, the bit values may be reused using alternating bit values for different branches in the same instruction stream 130.

In some embodiments, a single bit position can be used to identify multiple predicted branch paths by logically inverting the old value and using the inverted value as the new value for a subsequent predicted branch path. All other bits in the branch identifier are kept the same. Additionally, some of the bits in the branch identifier may be unused. Unused bits are available to new branches. In some embodiments, these bits are treated as a "don't care." However, the other bits correspond to parent branches, effectively allowing the new branches to "inherit" the bits of the old branches. As a result, it may be unnecessary to track the parent bit positions and values separately.

FIG. 4 depicts a schematic diagram of one embodiment of an instruction identification table 134 to identify a plurality of speculatively fetched instructions. In the illustrated embodiment, three bit positions are used to identify instructions associated with predicted branch paths of three branches in the instruction stream 130.

The instruction identification table 134 indicates that instructions $I_2$ and $I_3$, as well as branch instruction $BR_1$, are associated with the predicted branch path of the branch corresponding to position "0" (the rightmost bit position) because the bit value is "1" at bit position "0." This relationship can be seen in the instruction stream 130 of FIG. 2.

Similarly, the instruction identification table 134 indicates that instructions $I_4$ and $I_5$, as well as branch instruction $BR_2$, are associated with the predicted branch path of the branch corresponding to position "1" (the center bit position) because the bit value is "1" at bit position "1." The branch identifiers for instructions $I_4$, $I_5$, and $BR_2$ also indicate that these instructions are also associated with the predicted branch path of the branch corresponding to bit position "0." This relationship is indicated by the underlined "1" in bit position "0." The underlined values in the instruction identification table 134 indicate inherited bit values from previous predicted branch paths. The previous predicted branch paths also may be referred to as predicted parent branch paths. For example, the predicted branch path associated with branch $BR_1$ is a predicted parent branch path for the predicted branch path associated with branch $BR_2$.

The instruction identification table 134 also indicates that instructions $I_6$ and $I_7$ are associated with the predicted branch path of the branch corresponding to position "2" (the leftmost bit position) because the bit value is "1" at bit position "2." The branch identifiers for instructions $I_6$ and $I_7$ also indicate that these instructions are also associated with the predicted parent branch paths of branches $BR_0$ and $BR_1$ corresponding to bit positions "0" and "1."

In order to invalidate instructions corresponding to a predicted branch path (e.g., in response to a mispredicted branch), the instruction invalidation logic 124 may issue an invalidation command with a format of (pos, val), where pos designates the bit position corresponding to the predicted branch path, and val designates the bit value corresponding to the predicted branch path. Alternatively, in a multi-threading processor, the invalidation command may have a format of (threadID, pos, val) to indicate the thread identifier, as well. If the branch identifier is hard partitioned into multiple groups, then the thread ID may be omitted. In other embodiments, the instruction invalidation logic 124 may issue invalidation commands having other formats.

As an example, if the instruction invalidation logic 124 issues an invalidation command to invalidate, or flush, the instructions associated with the predicted branch path at branch $BR_2$, then the invalidation command may be formatted as (2, 1) to indicate that instructions with a bit value of "1" at the bit position "2" should be invalidated. Referring back to the instruction stream 130 of FIG. 2 and the instruction identification table 134 of FIG. 4, this invalidation command would invalidate instructions $I_6$ and $I_7$ because they each have a bit value of "1" at the bit position "2."

As another example, if the instruction invalidation logic 124 issues an invalidation command to invalidate, or flush, the instructions associated with the predicted branch path at branch $BR_1$, then the invalidation command may be formatted as (1, 1) to indicate that instructions with a bit value of "1" at the bit position "1" should be invalidated. Referring back to the instruction stream 130 of FIG. 2 and the instruction identification table 134 of FIG. 4, this invalidation command would invalidate instructions $I_4$ through $I_7$, including branch instruction $BR_2$, because they each have a bit value of "1" at the bit position "1." It should be noted that this invalidation command would invalidate instructions associated with predicted branch paths of both branches $BR_1$ and $BR_2$ because the predicted branch path of branch $BR_1$ is a predicted parent branch path of branch $BR_2$. As a result, all of the instructions $I_4$ through $I_7$ are dependent on the predicted branch path at branch $BR_1$, and instructions $I_6$ and $I_7$ include an inherited bit value of "1" at the bit position "1," so the invalidation command would invalidate all of the instructions $I_4$ through $I_7$.

As another example, if the instruction invalidation logic 124 issues an invalidation command to invalidate, or flush, the instructions associated with the predicted branch path at branch $BR_0$, then the invalidation command may be formatted as (0, 1) to indicate that instructions with a bit value of "1" at the bit position "0" should be invalidated. Referring back to the instruction stream 130 of FIG. 2 and the instruction identification table 134 of FIG. 4, this invalidation command would invalidate instructions $I_2$ through $I_7$, including branch instructions $BR_1$ and $BR_2$, because they each have a bit value of "1" at the bit position "0." It should be noted that this invalidation command would invalidate instructions associated with predicted branch paths of branches $BR_0$, $BR_1$, and $BR_2$ because the predicted branch path of branch $BR_0$ is a predicted parent branch path of branches $BR_1$ and $BR_2$. As a result, all of the instructions $I_2$ through $I_7$ are dependent on the predicted branch path at branch $BR_0$, and instructions $I_4$ through $I_7$ include an inherited bit value of "1" at the bit position "0," so the invalidation command would invalidate all of the instructions $I_2$ through $I_7$.

It should be noted that some embodiments may store a representation of the instruction identification table 134 in a single memory location. In other embodiments, the information corresponding to the instruction identification table 134 may be distributed across or throughout the pipeline.

Figure 5:
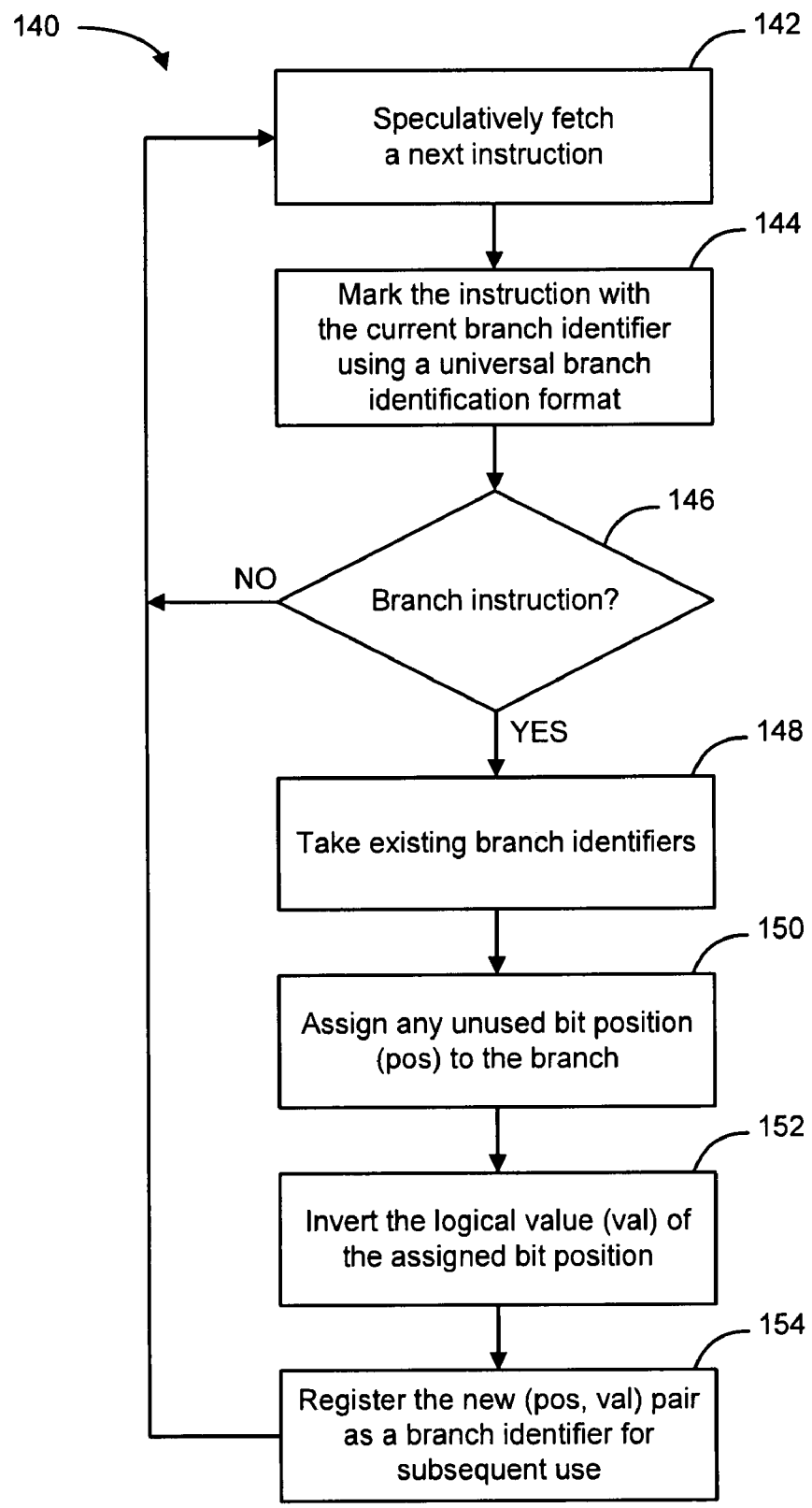
FIG. 5 depicts a schematic flow chart diagram of one embodiment of a method for assigning a universal branch identifier using the universal branch identification format of FIG. 3.

FIG. 5 depicts a schematic flow chart diagram of one embodiment of a method for assigning a universal branch identifier using the universal branch identification format of FIG. 3. Some embodiments of the assignment method 140 may be implemented in conjunction with the processor 100 shown in FIG. 1 and described above. Other embodiments of the assignment method 140 may be implemented in conjunction with other types of processors such as a multi-threaded processor.

In one embodiment, the bit value and bit position are initialized to default values such as (0,0). In the assignment method 140, the fetch logic 102 speculatively fetches 142 a next instruction for an instruction stream. Subsequently, the branch control unit 116 marks 144 the instruction with a current branch identifier using the universal branch identification format 132. In one embodiment, the branch control unit 116 invokes the instruction identification logic 122 to establish the instruction identification table 134, as described above, to record the branch identifier assigned to each instruction.

The branch control unit 116 then determines 146 if the fetched instruction is a branch instruction and, if not, returns to fetch 142 the next instruction in the instruction stream. Otherwise, if the fetched instruction is a branch instruction, then the branch control unit 116 takes 148 the existing branch identifiers and assigns 150 any unused bit position to the new branch. In one embodiment, the unused bit position may be a find first available in a particular order. Alternatively, the unused bit position may be any bit position regardless of the order of previously selected bit positions. Alternatively, this bit position may be the same as the position of the branch in the branch checkpoint register 126.

The branch identification logic 122 then inverts 152 the logical value of the newly assigned bit position to give the corresponding predicted branch path a unique value at that bit position. For example, if the bit value at the selected bit position is previously logical "0," then the branch identification logic 122 inverts the logical value to a logical "1." Alternatively, if the bit value at the selected bit position is previously logical "1," then the branch identification logic 122 inverts the logical value to a logical "0." The branch identification logic 122 then registers 154 the new bit position and bit value (i.e., the (pos, val) pair) as a branch identifier for subsequent use. This new (pos,val) pair is associated with the branch that caused it, although the branch itself inherits the old bit vector. The new (pos,val) pair is used in the invalidation command, should this branch mispredict. In one embodiment, the branch control unit 116 stores the updated branch identifier in a local memory device. The illustrated assignment method 140 then ends.

It should be noted that the branch identifier is updated, in one embodiment, so that only one bit value is changed at a time. All of the other bit values in the non-selected bit positions remain the same. Some of the bit positions might be unused because they either have not been assigned to a predicted branch path, yet, or the branches to which they were assigned have been resolved. These unused bits may be "don't cares." The remaining bits belong to parent branches and, by keeping these bit values of the parent branches, allow the new branch identifier to inherit the proper bit values to indicate a branch dependency between two or more branch paths. In this way, an invalidation command to invalidate a instructions of a parent branch path may be extended to flush all child branches and related instructions.

Figure 6:
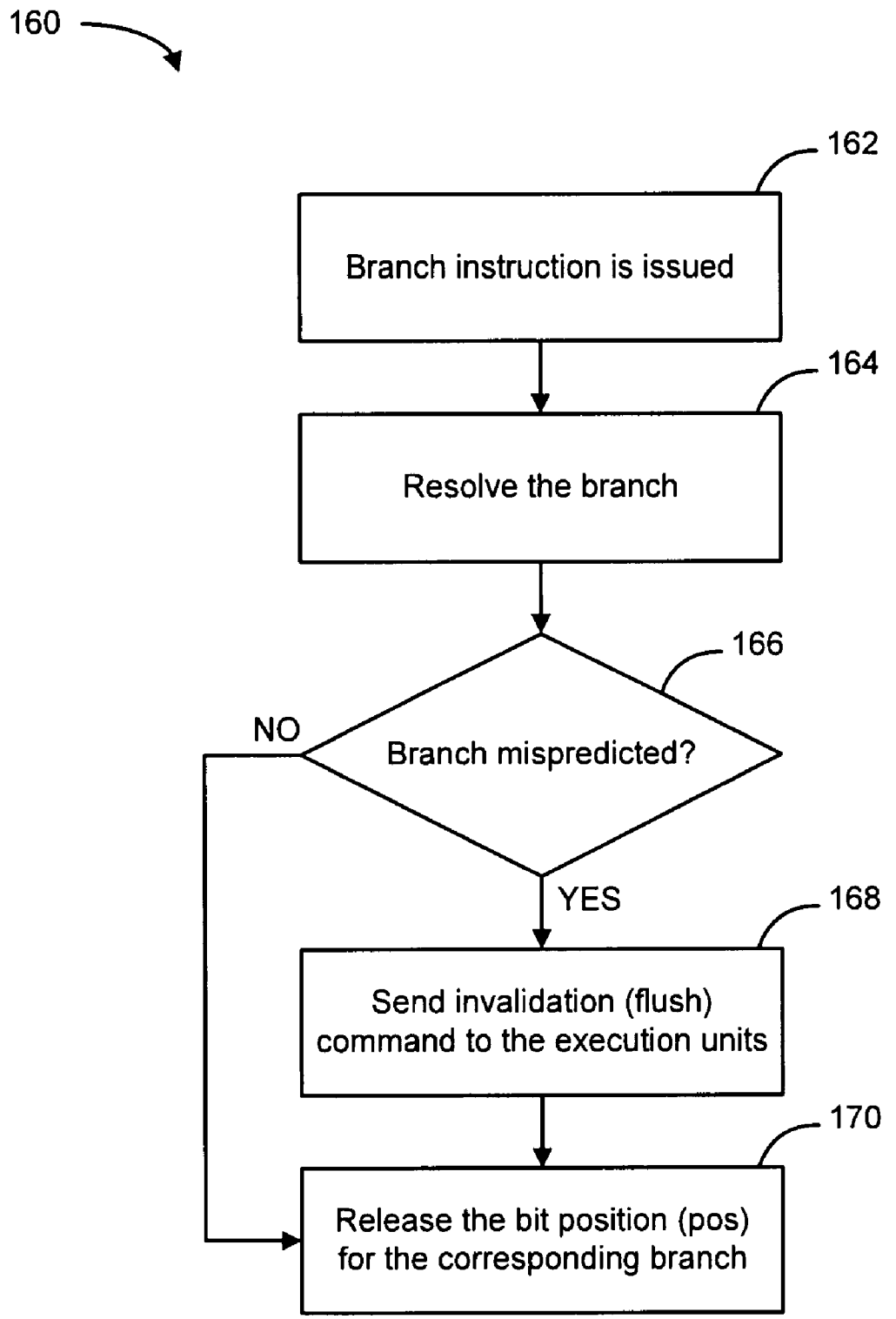
FIG. 6 depicts a schematic flow chart diagram of one embodiment of a method for branch resolution and flush command generation using the universal branch identification format of FIG. 3.

FIG. 6 depicts a schematic flow chart diagram of one embodiment of a method for branch resolution and flush command generation using the universal branch identification format of FIG. 3. Some embodiments of the resolution method 160 may be implemented in conjunction with the processor 100 shown in FIG. 1 and described above. Other embodiments of the resolution method 160 may be implemented in conjunction with other types of processors such as a multi-threaded processor.

In the resolution method 160, a branch instruction is issued 162 and the branch is resolved 164. The branch control unit 116 then determines 166 if the resolved branch was mispredicted. If the resolved branch was mispredicted, then the branch invalidation logic 124 sends 168 an invalidation, or flush, command to one or more of the execution units. In one embodiment, the invalidation command uses the (pos,val) pair associated with it during the assigning process 140. In response, each execution unit flushes the instructions identified by the invalidation command. In some embodiments, the invalidation command facilitates an atomic flush. Additional exemplary details of the instruction invalidation operation 168 are shown in FIG. 7 and described below.

After the branch invalidation logic 124 sends the invalidation command, or if the branch control unit 116 determines 166 that the branch was not mispredicted, then the branch identification logic 122 releases 170 the bit position for the corresponding branch so that the bit position can be reused for a subsequent branch in the instruction stream 130. The depicted resolution method 160 then ends.

Figure 7:
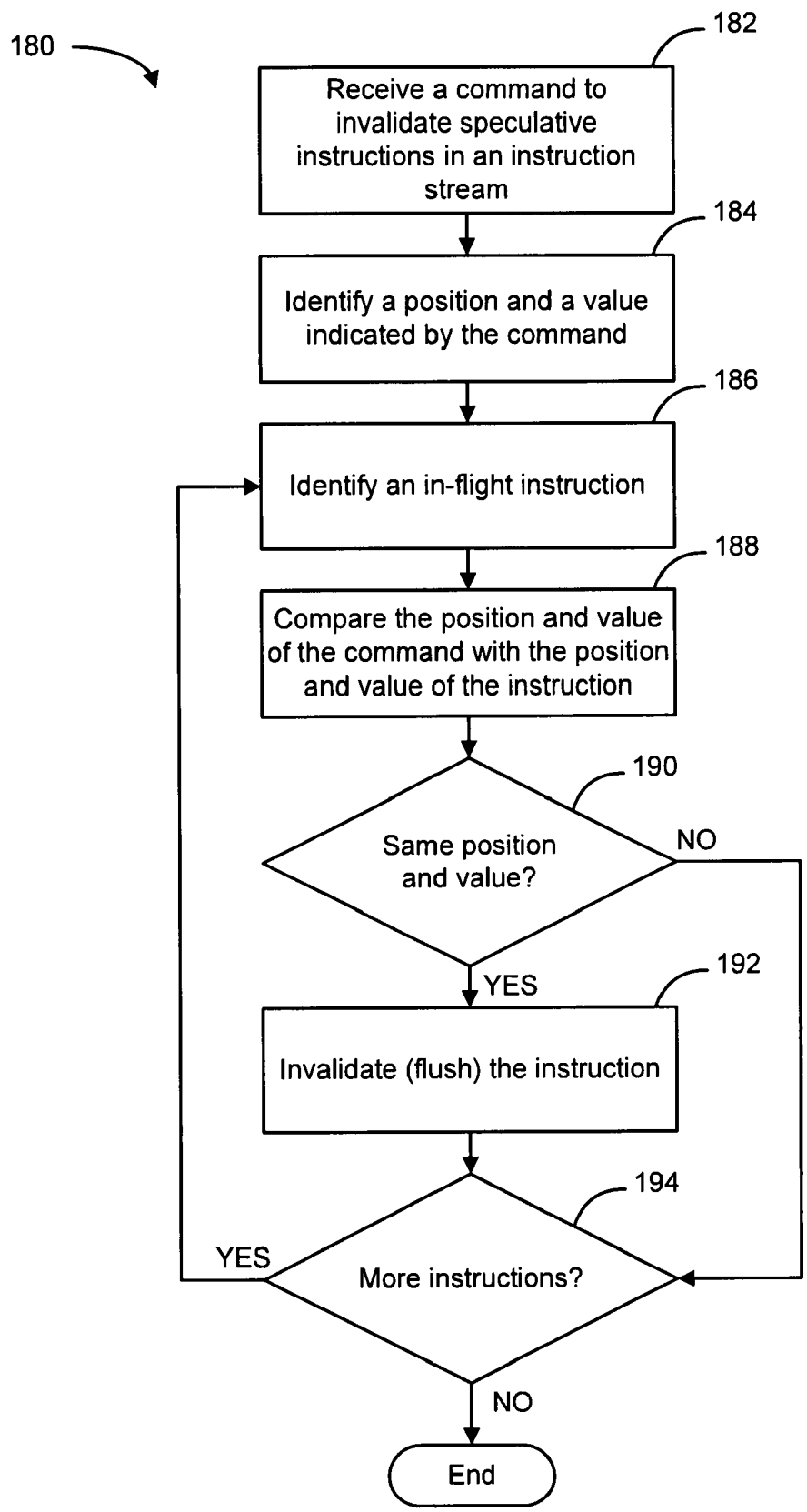
FIG. 7 depicts a schematic flow chart diagram of a more detailed embodiment of the instruction invalidation operation of the resolution method of FIG. 6.

FIG. 7 depicts a schematic flow chart diagram of one embodiment of an invalidation method 180. In one embodiment, the invalidation method 180 is a more detailed embodiment of the instruction invalidation operation 168 of the resolution method 160 of FIG. 6. Some embodiments of the invalidation method 180 may be implemented in conjunction with the processor 100 shown in FIG. 1 and described above. Other embodiments of the invalidation method 180 may be implemented in conjunction with other types of processors such as a multi-threaded processor.

In the invalidation method 180, the instruction invalidation logic 124 generates an invalidation command to invalidate instructions associated with one or more predicted branch paths. Each execution unit receives 182 the invalidation command to invalidate at least one speculative instruction in the instruction stream 130. In one embodiment, the instruction invalidation logic 124 broadcasts the invalidation command to all of the execution units at approximately the same time. In a further embodiment, the instruction invalidation logic 124 sends the invalidation command to one of the execution units, and each execution unit serially passes the invalidation command to an adjacent execution unit until all of the execution units have received the invalidation command.

Once an execution unit receives the invalidation command, the execution unit identifies 184 a bit position and a bit value indicated by the command. In some embodiments, a single invalidation command may indicate multiple bit positions and/or multiple bit values. The execution unit then identifies 186 one or more in-flight instructions and, for each in-flight instruction, the comparator 118 of the corresponding execution unit compares 188 the bit position and bit value of the invalidation command with the bit positions and bit values of the identified in-flight instruction. If the comparator 118 determines 190 that the in-flight instruction has the same bit value at the same bit position as the invalidation command, then the execution unit invalidates 192 the in-flight instruction. Otherwise, the execution unit does not invalidate the in-flight instruction. In some embodiments, the comparator 118 also may determine if the correct thread is indicated.

The execution unit then determines 194 if there are more instructions to be compared and, if so, continues to compare the in-flight instructions with the invalidation command, as described above. In another embodiment, the execution unit may perform an atomic flush to invalidate, or flush, multiple instructions at approximately the same time. Once all of the indicated in-flight instructions have been invalidated, the illustrated instruction invalidation operation 156 then ends.

It should be noted that embodiments of the assignment method 140, the resolution method 160, and the invalidation method 180 may be implemented in software, firmware, hardware, or some combination thereof. Additionally, some embodiments of the assignment method 140, the resolution method 160, and the invalidation method 180 may be implemented using a hardware or software representation of one or more algorithms related to the operations described above. For example, software, hardware, or a combination of software and hardware may be implemented to make a branch prediction, mark each speculatively fetched instruction with a branch identifier, or compare the actual branch with the predicted branch.

Embodiments of the invention also may involve a number of functions to be performed by a computer processor such as a central processing unit (CPU), a graphics processing unit (GPU), or a microprocessor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Mark-up Language) and other languages that may be used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of computers, such as computer servers, that utilize the invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the CPU or GPU as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for speculative branch predictions, the system comprising:
   branch prediction logic to predict a branch path for a branch in an instruction stream;
   fetch logic coupled to the branch prediction logic, the fetch logic to speculatively fetch an instruction corresponding to the predicted branch path;
   branch identification logic coupled to the branch prediction logic and the fetch logic, the branch identification logic to mark the speculatively fetched instruction with a branch identifier using a universal branch identification format, the universal branch identification format comprising a bit value at a bit position corresponding to the predicted branch path;
   branch invalidation logic coupled to the branch identification logic, the branch invalidation logic to invalidate the speculatively fetched instruction in response to an invalidation command comprising the bit value at the bit position corresponding to the predicted branch path, the invalidation command comprising a thread identifier to designate a thread of a multi-threaded process, the designated thread corresponding to the predicted branch path; and a computer readable storage medium comprising a hardware storage device for holding the speculatively fetched instruction.

2. The system according to claim 1, the branch invalidation logic coupled to an execution unit comprising comparison logic, the comparison logic to compare the invalidation command to a plurality of branch identifiers associated with a plurality of in-flight instructions to determine whether to invalidate any of the plurality of in-flight instructions.

3. The system according to claim 1, the invalidation command further comprising a format of (pos, val), where pos designates the bit position corresponding to the predicted branch path, and val designates the bit value corresponding to the predicted branch path.

4. The system according to claim 1, the invalidation command associated with an occurrence of a mispredicted branch.

5. The system according to claim 1, the universal branch identification format further comprising a second bit value at a second bit position corresponding to a predicted parent branch path of a parent branch in the instruction stream.

6. The system according to claim 1, further comprising a branch checkpoint register, the branch checkpoint register comprising a plurality of entries corresponding to a plurality of bit positions, including the bit position corresponding to the predicted branch path.

7. The system according to claim 1, the branch identification logic further configured to randomly assign the bit position to the predicted branch path.

8. The system according to claim 1, the branch identification logic further configured to implement a first find assignment routine to assign the bit position to the predicted branch path.

9. The system according to claim 1, the universal branch identification format comprising n bit positions, including the bit position corresponding to the predicted branch path, where n designates a limit of fetched, unresolved brandies in the instruction stream.

10. The system according to claim 9, the n bit positions partitioned into groups, each group corresponding to a unique thread.

11. The system according to claim 1, the universal branch identification format comprising n bit positions, including the bit position corresponding to the predicted branch path, where 2n designates a limit of identifiable branch paths.

12. The system according to claim 11, the branch identification logic further configured to assign a second bit value to designate a second predicted branch path, the second bit value at the same bit position corresponding to the predicted branch path.

13. The system according to claim 12, the branch identification logic further configured to invert the bit value to assign the second bit value at the same position for the second predicted branch path.

14. A method for speculative branch predictions executable with a computer processor, the method comprising:
predicting a branch path for a branch in an instruction stream;
fetching an instruction corresponding to the predicted branch path;
using the processor to mark the speculatively fetched instruction with a branch identifier using a universal branch identification format, the universal branch identification format comprising a bit value at a bit position corresponding to the predicted branch path; and
invalidating the speculatively fetched instruction in response to an occurrence of an exception.

15. The method according to claim 14, further comprising invalidating the speculatively fetched instruction in response to an invalidation command comprising the bit value at the bit position corresponding to the predicted branch path.

16. The method according to claim 15, further comprising comparing the invalidation command to a plurality of branch identifiers associated with a plurality of in-flight instructions to determine whether to invalidate any of the plurality of in-flight instructions.

17. The method according to claim 15, further comprising invalidating the speculatively fetched instruction in response to an occurrence of a mispredicted branch.

18. The method according to claim 14, the universal branch identification format comprising a plurality of bit positions, including the bit position corresponding to the predicted branch path, each of the plurality of bit positions corresponding to at least one of a plurality of predicted branch paths of the instruction stream.

19. The method according to claim 18, further comprising storing an instruction identification table comprising a plurality of speculatively fetched instructions and a corresponding plurality of branch identifiers.

20. A computer readable storage medium embodying a program of machine-readable instructions, executable by a digital processor, to perform operations to facilitate speculative instruction invalidation, the operations comprising:
fetch an instruction corresponding to a predicted branch path in an instruction stream;
mark the speculatively fetched instruction with a branch identifier using a universal branch identification format, the universal branch identification format comprising a bit value at a bit position corresponding to the predicted branch path;
invalidate the speculatively fetched instruction in response to an invalidation command comprising the bit value at the bit position corresponding to the predicted branch path; and
invalidate the speculatively fetched instruction in response to an occurrence of an exception.

21. The computer readable storage medium according to claim 20, the operations further comprising an operation to compare the invalidation command to a plurality of branch identifiers associated with a plurality of in-flight instructions to determine whether to invalidate any of the plurality of in-flight instructions.

22. The computer readable storage medium according to claim 20, the operations further comprising an operation to generate the invalidation command in response to an occurrence of a mispredicted branch.

23. The computer readable storage medium according to claim 20, the operations further comprising an operation to generate the invalidation command in response to the occurrence of the exception.

24. The computer readable storage medium according to claim 20, the operations further comprising an operation to store an instruction identification table comprising a plurality of speculatively fetched instructions and a corresponding plurality of branch identifiers.

25. A system for speculative branch predictions, the system comprising:
branch prediction logic to predict a branch path for a branch in an instruction stream;
fetch logic coupled to the branch prediction logic, the fetch logic to speculatively fetch an instruction corresponding to the predicted branch path;
branch identification logic coupled to the branch prediction logic and the fetch logic, the branch identification logic to mark the speculatively fetched instruction with a branch identifier using a universal branch identification format, the universal branch identification format comprising a bit value at a bit position corresponding to the predicted branch path;
branch invalidation logic coupled to the branch identification logic, the branch invalidation logic to invalidate the speculatively fetched instruction in response to an invalidation command comprising the bit value at the bit position corresponding to the predicted branch path, the invalidation command associated with an occurrence of an exception, the invalidated speculatively fetched instruction subsequent to an instruction associated with the occurrence of the exception; and a computer readable storage medium comprising a hardware storage device for holding the speculatively fetched instruction.

26. The system according to claim 25, the universal branch identification format further comprising a second bit value at a second bit position corresponding to a predicted parent branch path of a parent branch in the instruction stream.

27. The system according to claim 25, further comprising a branch checkpoint register, the branch checkpoint register comprising a plurality of entries corresponding to a plurality of bit positions, including the bit position corresponding to the predicted branch path.

28. The system according to claim 25, the branch identification logic further configured to randomly assign the bit position to the predicted branch path.

29. The system according to claim 25, the branch identification logic further configured to implement a first find assignment routine to assign the bit position to the predicted branch path.

30. The computer readable storage medium according to claim 20, the universal branch identification format further comprising a second bit value at a second bit position corresponding to a predicted parent branch path of a parent branch in the instruction stream.

31. The computer readable storage medium according to claim 20, wherein the machine-readable instructions are operable such that a branch checkpoint register comprises a plurality of entries corresponding to a plurality of bit positions, including the bit position corresponding to the predicted branch path.

32. The computer readable storage medium according to claim 20, wherein the machine-readable instructions are operable such that the bit position is randomly assigned to the predicted branch path.

33. The computer readable storage medium according to claim 20, wherein the machine-readable instructions are operable such that a first find assignment routine is implemented to assign the bit position to the predicted branch path.

* * * * *